United States Patent
AlGhunaimi et al.

(10) Patent No.: US 12,054,409 B2
(45) Date of Patent: Aug. 6, 2024

(54) METHOD TO TREAT NANO-FILTRATION MEMBRANE RETENTATE FOR REUSE IN FRACTURING AND DRILLING APPLICATIONS

(71) Applicant: Saudi Arabian Oil Company, Dhahran (SA)

(72) Inventors: Fahd Ibrahim AlGhunaimi, Dhahran (SA); Hind Saleh Aldossary, Dhahran (SA); Mona Saad Dossary, Dhahran (SA); Tao Chen, Dhahran (SA); Mohammed A. Bataweel, Dhahran (SA); Abadi A. Mutairi, Dhahran (SA); Norah W. Aljuryyed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 318 days.

(21) Appl. No.: 17/565,949

(22) Filed: Dec. 30, 2021

(65) Prior Publication Data
US 2023/0227337 A1   Jul. 20, 2023

(51) Int. Cl.
*C02F 1/44* (2023.01)
*C02F 1/52* (2023.01)
(Continued)

(52) U.S. Cl.
CPC ............ *C02F 1/5236* (2013.01); *C02F 1/442* (2013.01); *C02F 2101/101* (2013.01);
(Continued)

(58) Field of Classification Search
CPC .. C02F 1/442; C02F 1/5236; C02F 2101/101; C02F 2103/08
See application file for complete search history.

(56) References Cited

U.S. PATENT DOCUMENTS 5,587,083 A * 12/1996 Twardowski ........ B01D 61/026
210/651
9,266,754 B2   2/2016 Wahid
(Continued)

OTHER PUBLICATIONS

Aubé, Bernard, Moacir Lamares, and Stéphan Lone Sang. "A Pilot Comparison of Sulphate Removal Technologies at Neves Corvo." 11th ICARD| IMWA| MWD (2018). (Year: 2018).*
(Continued)

*Primary Examiner* — Bradley R Spies
(74) *Attorney, Agent, or Firm* — DINSMORE & SHOHL LLP

(57) ABSTRACT

A process of treating nano-filtration membrane retentate comprises introducing seawater comprising a sulfate ion concentration of greater than or equal to 3000 mg/l to the NF membrane to produce a retentate stream and a permeate stream, wherein the retentate stream has a sulfate ion concentration greater than or equal to 10,000 mg/l, and mixing barium additives comprising barium chloride dehydrate ($BaCl_2 \cdot 2H_2O$), barium chloride ($BaCl_2$), or both with the retentate stream to precipitate sulfate from the retentate stream to form barite ($BaSO_4$) and reduce the sulfate ion concentration, wherein the barium additives are added into the retentate stream at a barium ion concentration of greater than 10,000 mg/l.

13 Claims, 2 Drawing Sheets

(51) Int. Cl.
  *C02F 101/10* (2006.01)
  *C02F 103/08* (2006.01)
  *C02F 103/10* (2006.01)
(52) U.S. Cl.
  CPC ...... *C02F 2103/08* (2013.01); *C02F 2103/10* (2013.01); *C02F 2209/10* (2013.01); *C02F 2305/00* (2013.01)

(56) References Cited

U.S. PATENT DOCUMENTS

| | | | |
|---|---|---|---|
| 9,643,865 | B2 | 5/2017 | Matherly et al. |
| 10,501,680 | B2 | 12/2019 | Li et al. |
| 2013/0048562 | A1 | 2/2013 | Keister |
| 2016/0176734 | A1 | 6/2016 | Wahid |
| 2019/0225867 | A1 | 7/2019 | Li et al. |

OTHER PUBLICATIONS

Al-Alaway et al., "Coagulation/Flocculation, Microfiltration and Nanofiltration for Water Treatment of Main Outfall Drain for Injection in Nasiriyah Oil Field", Iraqi Journal of Chemical and Petroleum Engineering, vol. 15, No. 4, pp. 47-66, Dec. 2014.
Boerlage et al., "Stable barium sulphate supersaturation in reverse osmosis", Journal of Membrane Science, vol. 179, pp. 53-68, 2000.
Van Der Bruggen et al., "Drawbacks of applying nanofiltration and how to avoid them: A review", Separation and Purification Technology, vol. 63, pp. 251-263, 2008.
Dera et al., "Phase Analysis and Crystal Morphology of Barium Sulphate Precipitated from the Laminar Flowing Water", The 4th International Conference on Advanced Materials Science and Technology, Materials Science and Engineering, vol. 202, 012029, 2017.
Drioli et al., "Integrated system for recovery of CaCO3, NaCl and MgSO4 7H2O from nanofiltration retentate", Journal of Membrane Science, vol. 239, pp. 27-38, 2004.
Labban et al., "Fundamentals of low-pressure nanofiltration: Membrane characterization, modeling and understanding the multi-ionic interactions in water softening", Journal of Membrane Science, vol. 521, pp. 18-32, 2017.
Majid et al., "Seawater Based Fracturing Fluid: A Game Changer in Hydraulic Fracturing Applications in Saudi Arabia", Society of Petroleum Engineers, SPE-184015-MS, 15 pages.
Mulyanti et al., "Wastewater treatment by nanofiltration membranes", IPO Conference Series: Earth and Environmental Science, vol. 142, 012017, 2018.
Orlewski et al., "Modeling of Mixing-Precipitation Processes: Agglomeration", Chemical Engineering Technology, vol. 43, No. 00, pp. 1-12, 2020.
Rahimpour et al., "Preparation and characterization of asymmetric polyethersulfone and thin-film composite polyamide nanofiltration membranes for water softening", Applied Surface Science, vol. 256, pp. 1657-1663, 2010.
Water Quality Association, "Reverse Osmosis (RO) Fact Sheet, Basics of Spiral Would RO Membranes", International Headquarters & Laboratory, www.wqa.org, 8 pages, 1996.
Schafer et al., "Fouling in Nanofiltration", Nanofiltration-Principles and Applications 1 Chapter 8, 41 pages, Jan. 2004.
Shon et al., "Nanofiltration for water and wastewater treatment—a mini review", Water Eng. Sci. vol. 6, pp. 47-53, 2013.
Sutherland, "Developments in filtration: What is nanofiltration", Filtration+Separation, 4 pages, Oct. 2008.

* cited by examiner

METHOD TO TREAT NANO-FILTRATION MEMBRANE RETENTATE FOR REUSE IN FRACTURING AND DRILLING APPLICATIONS

TECHNICAL FIELD

Embodiments of the present disclosure generally relate to processes and systems of treating nano-filtration (NF) membrane retentate.

BACKGROUND

Water-based hydraulic fracturing technology is commonly used in stimulations to recover hydrocarbon specifically from the tight formation. This technology involves the use of large volumes of fresh water and many concerns raised on the potential risks on the drinking water resources. In general, seawater is a good candidate to replace fresh water for fracturing applications. However, seawater having high sulfate concentration (greater than or equal to 3,000 milligrams per liter (mg/l)) may be incompatible with most of formation water. This seawater may cause scale formation issues if used for fracturing without treatment due to the precipitation of $BaSO_4$.

Nano-filtration (NF) membrane technologies may be used to remove sulfates from seawater. Seawater could be introduced into the NF membrane, and separated into two streams: the permeate stream (treated water) and the retentate stream (retained and untreated water). The retentate stream may be referred to as brine. In general, the retentate stream is disposed or left untreated due to the high concentration of contaminants. Thus, NF membrane creates large volume of waste water (retentate stream) with low recovery of water.

To reuse the retentate stream in fracturing and drilling applications, the retentate stream should be treated to reduce the sulfate ion concentration. However, due to the high concentration of total dissolved solids, the retentate stream cannot be treated by other type of membranes. Furthermore, other processes of treating the retentate stream require complex infrastructure, which may increase the cost.

SUMMARY

Accordingly, there is an ongoing need for processes of treating NF membrane retentate that enable efficient and cost effective recovery of water. Embodiments of the present disclosure meet this need by utilizing barium additives, which are mixed with the retentate stream to precipitate sulfate from the retentate stream, thereby reducing the sulfate ion concentration of the retentate stream. The treated retentate stream could be reused in fracturing and drilling applications. Thus, the processes and systems of the present disclosure increase the water recovery without additional or complex infrastructure. Additionally, the processes and systems of the present disclosure produce valuable byproducts, barites, that may be used in drilling fluids.

According to one or more embodiments of the present disclosure, a process of treating NF membrane retentate comprises introducing seawater comprising sulfate concentration of greater than or equal to 3000 mg/l to the NF membrane to produce a retentate stream and a permeate stream, wherein the retentate stream has a sulfate ion concentration greater than or equal to 10.000 mg/l. The method further comprise mixing barium additives comprising barium chloride dehydrate ($BaCl_2 \cdot 2H_2O$), barium chloride ($BaCl_2$), or both with the retentate stream to precipitate sulfate from the retentate stream to form barite ($BaSO_4$) and reduce the sulfate ion concentration, wherein the barium additives are added into the retentate stream at a barium ion concentration of greater than 10,000 mg/l.

Additional features and advantages of the embodiments described in the present disclosure will be set forth in the detailed description which follows, and in part will be readily apparent to those skilled in the art from that description or recognized by practicing the embodiments described in the present disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawing in which.

Figure 1:
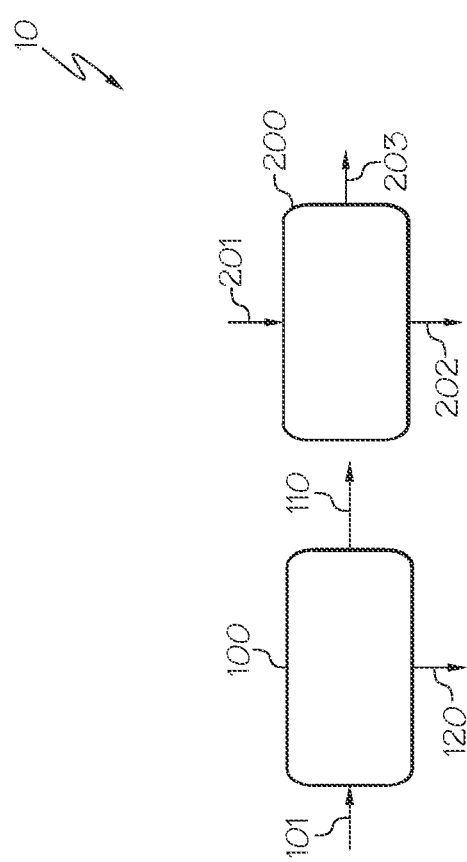
FIG. 1 is a generalized schematic diagram of an embodiment of a system for treating NF membrane retentate, according to one or more embodiments described in this disclosure.

For the purpose of describing the simplified schematic illustrations and descriptions of FIG. 1, the numerous valves, temperature sensors, pressure sensors, electronic controllers, pumps, and the like that may be employed and well known to those of ordinary skill in the art of certain chemical processing operations are not included. Further, accompanying components that are often included in chemical processing operations, such as, for example, air supplies, heat exchangers, surge tanks, compressors, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines, which may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows, which do not connect two or more system components, signify a product stream, which exits the depicted system, or a system inlet stream, which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIG. 1. Mixing or combining may also include mixing by directly introducing both streams into the same reactor, separation device, or other system component. For example, it should be understood that when two streams are depicted as being combined directly prior to entering a separation unit or reactor, that in some embodiments the streams could equivalently be introduced into the separation unit or reactor individually and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

As used in this disclosure, the term "total dissolved solids" may refer to total amount of dissolved ions including salts, minerals, and metals. Dissolved ions may include bicarbonate, calcium, chloride, sulfate, magnesium, potassium, sodium, strontium, or combinations thereof.

As used in this disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in this disclosure, passing a stream from one unit "directly" to another unit may refer to passing the stream from the first unit to the second unit without passing the stream through an intervening reaction system or intervening separation system that substantially changes the composition of the stream.

Embodiments of the present disclosure are directed to processes and systems of treating NF membrane retentate. Referring to FIG. 1 systems 10 of treating NF membrane retentate is schematically depicted. The system 10 may be utilized in processes of treating NF membrane.

Referring to FIG. 1, the process comprises introducing seawater 101 comprising a sulfate ion concentration of greater than or equal to 3,000 mg/l to the NF membrane 100 to produce a retentate stream 110 and a permeate stream 120. The retentate stream 110 may have a sulfate ion concentration of greater than or equal to 10,000 mg/l. The process further comprises mixing barium additives 201 comprising barium chloride dehydrate ($BaCl_2·2H_2O$), barium chloride ($BaCl_2$), or both with the retentate stream 110. The processes and systems of the present disclosure reduce the sulfate ion concentration of the retentate stream 110 by utilizing barium additives 201. Barium additives 201 are mixed with the retentate stream 101 to precipitate sulfate from the retentate stream 101. The barium additives treated retentate stream could be reused in fracturing and drilling applications. Thus, the processes and systems of the present disclosure increase the water recovery without additional or complex infrastructure. Further, the processes and systems of the present disclosure provide valuable byproducts, barite, which could be used as a weighting agent in drilling fluids.

The seawater 101 may be introduced to the NF membrane 100. In embodiments, the seawater 101 may comprise a sulfate ion concentration of greater than or equal to 3.000 mg/l, greater than or equal to 3.500 mg/l, or greater than or equal to 4,000 mg/l. In embodiments, the seawater 101 may comprise a sulfate ion concentration of less than or equal to 9.000 mg/l, less than or equal to 7,000 mg/l, or less than or equal to 5,000 mg/l. In some embodiments, the seawater 101 may comprise a sulfate ion concentration of from 3,000 mg/l to 9,000 mg/l, from 3.000 mg/l to 7,000 mg/l, from 3.000 mg/l to 5.000 mg/l, from 3.500 mg/l to 9,000 mg/l, from 3.500 mg/l to 7.000 mg/l, from 3.500 mg/l to 5.000 mg/l, from 4.000 mg/l to 9.000 mg/l, from 4,000 mg/l to 7.000 mg/l, from 4,000 mg/l to 5,000 mg/l, or from any other range between 3,000 mg/l and 9,000 mg/l.

In embodiments, the seawater 101 may comprise a total dissolved solids concentration of greater than or equal to 42.000 mg/l, greater than or equal to 43.000 mg/l, or greater than or equal to 45,000 mg/l. In embodiments, the seawater 101 may comprise a total dissolved solids concentration of less than or equal to 65.000 mg/l, less than or equal to 60,000 mg/l, or less than or equal to 55,000 mg/l. In some embodiments, the seawater 101 may comprise a total dissolved solids concentration of from 42,000 mg/l to 65,000 mg/l, from 42,000 mg/l to 60,000 mg/l, from 42,000 mg/l to 55,000 mg/l, from 43,000 mg/l to 65,000 mg/l, from 43.000 mg/l to 60,000 mg/l, from 43.000 mg/l to 55,000 mg/l, from 45,000 mg/l to 65,000 mg/l, from 45,000 mg/l to 60,000 mg/l, from 45.000 mg/l to 55.000 mg/l, or from any other range between 42.000 mg/l and 65,000 mg/l.

The seawater 101 may further comprise divalent cations. In embodiments, the divalent cations may comprise $Ca^{2+}$, $Mg^{2+}$, $Sr^{2+}$, or combinations thereof.

In embodiments, the seawater 101 may comprise a calcium ion concentration of from 400 mg/l to 900 mg/l, from 400 mg/l to 800 mg/l, from 400 mg/l to 700 mg/l, from 450 mg/l to 900 mg/l, from 450 mg/l to 800 mg/l, from 450 mg/l to 700 mg/l, or from any other range between 400 mg/l and 900 mg/l.

In embodiments, the seawater 101 may comprise a magnesium ion concentration of from 1.000 mg/l to 3.500 mg/l, from 1,000 mg/l to 3,000 mg/l, from 1.000 mg/l to 2.500 mg/l, from 1.250 mg/l to 3.500 mg/l, from 1.250 mg/l to 3.000 mg/l, from 1.250 mg/l to 2.500 mg/l, from 1,500 mg/l to 3.500 mg/l, from 1,500 mg/l to 3,000 mg/l, from 1,500 mg/l to 2,500 mg/l, or from any other range between 1,000 mg/l and 3,500 mg/l.

In embodiments, the seawater 101 may comprise a strontium ion concentration of from 0.0001 mg/l to 1 mg/l, from 0.0001 mg/l to 0.9 mg/l, from 0.0001 mg/l to 0.8 mg/l, from 0.001 mg/l to 1 mg/l, from 0.001 mg/l to 0.9 mg/l, from 0.001 mg/l to 0.8 mg/l, from 0.01 mg/l to 1 mg/l, from 0.01 mg/l to 0.9 mg/l, from 0.01 mg/l to 0.8 mg/l, or from any other range between 0.0001 mg/l and 1 mg/l.

The seawater 101 may further comprise monovalent ions. In embodiments, the monovalent ions may comprise $Na^+$, $K^+$, $Cl^-$, or combinations thereof.

In embodiments, the seawater 101 may comprise a sodium ion concentration of from 17.000 mg/l to 25,000 mg/l, from 17,000 mg/l to 20,000 mg/l, from 17.000 mg/l to 18,000 mg/l, from 17.200 mg/l to 25.000 mg/l, from 17.200 mg/l to 20.000 mg/l, from 17.200 mg/l to 18,000 mg/l, or from any other range between 17.000 mg/l and 25,000 mg/l.

In embodiments, the seawater 101 may comprise a potassium ion concentration of from 500 mg/l to 850 mg/l, from 500 mg/l to 800 mg/l, from 600 mg/l to 850 mg/l, from 600 mg/l to 800 mg/l, from 700 mg/l to 850 mg/l, from 700 mg/l to 800 mg/l, or from any other range between 500 mg/l and 850 mg/l.

In embodiments, the seawater 251 may comprise a chloride ion concentration of from 25,000 mg/l to 35,000 mg/l, from 25.000 mg/l to 33,000 mg/l, from 25.000 mg/l to 32.000 mg/l, from 25.100 mg/l to 35,000 mg/l, from 25.100 mg/l to 33,000 mg/l, from 25,100 mg/l to 32,000 mg/l, or from any other range between 25.000 mg/l and 35,000 mg/l.

The seawater 101 may further comprise a bicarbonate ion. In embodiments, the seawater 101 may comprise a bicarbonate ion concentration of from 50 mg/l to 300 mg/l, from 50 mg/l to 250 mg/l, from 50 mg/l to 200 mg/l, from 75 mg/l to 300 mg/l, from 75 mg/l to 250 mg/l, from 75 mg/l to 200 mg/l, from 100 mg/l to 300 mg/l, from 100 mg/l to 250 mg/l, from 100 mg/l to 200 mg/l, or from any other range between 50 mg/l and 300 mg/l.

Still referring to FIG. 1, the seawater 101 may be separated in the NF membrane 100 into the retentate stream 110 and the permeate stream 120. The NF membrane 100 may be operated to separate the seawater 101 into the permeate stream 120 and the retentate stream 110. The NF membrane 100 may be permeable to water, but may not be permeable to the sulfate ions in the seawater 101. The NF membrane 100 may filter the divalent cations in the seawater 101. The NF membrane 100 may not filter the monovalent ions in the seawater 101. In embodiments, the NF membrane 100 may soften the seawater 101 by retaining scale-forming, hydrate divalent cations, such as $Ca^{2+}$, $Mg^{2+}$, or both, while passing smaller hydrated monovalent ions such as $Na^+$, $K^+$, $Cl^-$, or combinations thereof.

In embodiments, the NF membrane 100 may comprise polyethylene terephthalate, piperazine, trimesoyl chloride, on top of a polysulfone or combinations thereof.

In embodiments, the NF membrane 100 may have an average pore size of from 1 nanometers (nm) to 10 nm, or from 1 nm to 8 nm, from 2 nm to 10 nm, or from 2 nm to 8 nm.

In embodiments, the NF membrane 100 may also utilize a separate reverse osmosis (RO) membrane, which may remove smaller hydrated monovalent ions, such as $Na^+$, $K^+$, $Cl^-$, or combinations thereof, that the NF membrane 100 may not remove.

Still referring to FIG. 1, the retentate stream 110 may be separated from the seawater 101 in the NF membrane 100. Without additional treatments, due to the high level of sulfate ion concentration, total dissolved solids concentration, or both, the retentate stream 110 typically is considered a waste stream and usually disposed back to the source of the feed water or by using other disposal methods such as deep well injection and evaporation ponds.

In embodiments, the retentate stream 110 may comprise a sulfate ion concentration of greater than or equal to 9.500 mg/l, greater than or equal to 10.000 mg/l, or greater than or equal to 10,500 mg/l. In embodiments, the retentate stream 110 may comprise a sulfate ion concentration of less than or equal to 30,000 mg/l, less than or equal to 25,000 mg/l, or less than or equal to 20,000 mg/l. In some embodiments, the retentate stream 110 may comprise a sulfate ion concentration of from 9,500 mg/l to 30,000 mg/l, from 9.500 mg/l to 25,000 mg/l, from 9,500 mg/l to 20,000 mg/l, from 10,000 mg/l to 30.000 mg/l, from 10,000 mg/l to 25,000 mg/l, from 10,000 mg/l to 20.000 mg/l, from 10,500 mg/l to 30.000 mg/l, from 10.500 mg/l to 25.000 mg/l, from 10,500 mg/l to 20,000 mg/l, or from any other range between 9.500 mg/l and 30,000 mg/l.

In embodiments, the retentate stream 110 may comprise a total dissolved solids concentration of greater than or equal to 68.000 mg/l, greater than or equal to 70,000 mg/l, or greater than or equal to 72.000 mg/l. In embodiments, the retentate stream 110 may comprise a total dissolved solids concentration of less than or equal to 120,000 mg/l, less than or equal to 110,000 mg/l, or less than or equal to 100.000 mg/l. In some embodiments, the retentate stream 110 may comprise a total dissolved solids concentration of from 68.000 mg/l to 120,000 mg/l, from 68.000 mg/l to 110,000 mg/l, from 68,000 mg/l to 100,000 mg/l, from 70,000 mg/l to 120,000 mg/l, from 70.000 mg/l to 110,000 mg/l, from 70,000 mg/l to 100,000 mg/l, from 72.000 mg/l to 120,000 mg/l, from 72.000 mg/l to 110,000 mg/l, from 72.000 mg/l to 100,000 mg/l, or from any other range between 68,000 mg/l and 120,000 mg/l.

In embodiments, the retentate stream 110 may comprise a calcium ion concentration of from 1.000 mg/l to 3.000 mg/l, from 1,000 mg/l to 2,500 mg/l, from 1,000 mg/l to 2.000 mg/l, from 1.100 mg/l to 3,000 mg/l, from 1.100 mg/l to 2.500 mg/l, from 1.100 mg/l to 2.000 mg/l, from 1.200 mg/l to 3,000 mg/l, from 1,200 mg/l to 2.500 mg/l, from 1.200 mg/l to 2,000 mg/l, or from any other range between 1.000 mg/l and 3,000 mg/l.

In embodiments, the retentate stream 110 may comprise a magnesium ion concentration of from 4,000 mg/l to 11,000 mg/l, from 4,000 mg/l to 10,000 mg/l, from 4,000 mg/l to 9.000 mg/l, from 5,000 mg/l to 11,000 mg/l, from 5,000 mg/l to 10,000 mg/l, from 5,000 mg/l to 9,000 mg/l, from 6,000 mg/l to 11.000 mg/l, from 6,000 mg/l to 10,000 mg/l, from 6,000 mg/l to 9.000 mg/l, or from any other range between 4.000 mg/l and 11,000 mg/l.

In embodiments, the retentate stream 110 may comprise a strontium ion concentration of from 20 mg/l to 50 mg/l, from 20 mg/l to 45 mg/l, from 20 mg/l to 40 mg/l, from 25 mg/l to 50 mg/l, from 25 mg/l to 45 mg/l, from 25 mg/l to 40 mg/l, from 30 mg/l to 50 mg/l, from 30 mg/l to 45 mg/l, from 30 mg/l to 40 mg/l, or from any other range between 20 mg/l and 50 mg/l.

The retentate stream 110 may further comprise monovalent ions. In embodiments, the monovalent ions may comprise $Na^+$, $K^+$, $Cl^-$, or combinations thereof.

In embodiments, the retentate stream 110 may comprise a sodium ion concentration of from 15.500 mg/l to 30,000 mg/l, from 15,500 mg/l to 25,000 mg/l, from 16,000 mg/l to 30,000 mg/l, from 16,000 mg/l to 25,000 mg/l, or from any other range between 15.500 mg/l and 30,000 mg/l. In embodiments, the sodium ion concentration of retentate stream 110 may be less than those of the seawater 101. In embodiments, the sodium ion concentration of retentate stream 110 may be greater than those of permeate stream 120.

In embodiments, the retentate stream 110 may comprise a potassium ion concentration of from 875 mg/l to 1.100 mg/l, from 875 mg/l to 1.000 mg/l, from 900 mg/l to 1.100 mg/l, from 900 mg/l to 1,000 mg/l, or from any other range between 875 mg/l and 1.100 mg/l. In embodiments, the potassium ion concentration of the retentate stream 110 may be greater than those of the permeate stream 120.

In embodiments, the retentate stream 110 may comprise a chloride ion concentration of from 30,000 mg/l to 55,000 mg/l, from 30,000 mg/l to 50,000 mg/l, from 30,000 mg/l to 45,000 mg/l, from 31,000 mg/l to 55,000 mg/l, from 31,000 mg/l to 50,000 mg/l, from 31,000 mg/l to 45,000 mg/l, or from any other range between 30,000 mg/l and 55,000 mg/l. In embodiments, the chloride concentration of the retentate stream 130 may be greater than those of the seawater 301. In embodiments, the chloride concentration of the retentate stream 130 may be greater than those of the permeate stream 120.

The retentate stream 110 may further comprise a bicarbonate ion. In embodiments, the retentate stream 110 may comprise a bicarbonate ion concentration of from 50 mg/l to 550 mg/l, from 50 mg/l to 500 mg/l, from 50 mg/l to 450 mg/l, from 75 mg/l to 550 mg/l, from 75 mg/l to 500 mg/l, from 75 mg/l to 450 mg/l, from 100 mg/l to 550 mg/l, from 100 mg/l to 500 mg/l, from 100 mg/l to 450 mg/l, or from any other range between 50 mg/l and 550 mg/l.

Still referring to FIG. 1, the permeate stream 120 may be separated from the seawater 101 in the NF membrane 100. The permeate stream 120 may have low concentration of sulfate ions and divalent cations, such as $Ca^{2+}$, $Mg^{2+}$, $Sr^{2+}$. The low sulfate concentration along with low divalent cations concentrations in the permeate stream 120 may minimize the formation of calcium sulfates, magnesium sulfates, strontium sulfates, or combinations thereof, and result in clean water. Thus, the permeate stream 120 may be reused without additional treatments.

In embodiments, the permeate stream 120 may comprise a sulfate ion concentration of greater than or equal to 0.01 mg/l, greater than or equal to 0.1 mg/l, or greater than or equal to 1 mg/l. In embodiments, the permeate stream 120 may comprise a sulfate ion concentration of less than or equal to 100 mg/l, less than or equal to 50 mg/l, or less than or equal to 30 mg/l. In some embodiments, the permeate stream 120 may comprise a sulfate ion concentration of from 0.01 mg/l to 100 mg/l, from 0.01 mg/l to 50 mg/l, from 0.01 mg/l to 30 mg/l, from 0.1 mg/l to 100 mg/l, from 0.1 mg/l to 50 mg/l, from 0.1 mg/l to 30 mg/l, from 1 mg/l to 100 mg/l, from 1 mg/l to 50 mg/l, from 1 mg/l to 30 mg/l, or from any other range between 0.01 mg/l and 100 mg/l.

In embodiments, the permeate stream 120 may comprise a total dissolved solids concentration of greater than or equal to 20.000 mg/l, greater than or equal to 25,000 mg/l, or greater than or equal to 30,000 mg/l. In embodiments, the permeate stream 120 may comprise a total dissolved solids concentration of less than or equal to 41,000 mg/l, less than or equal to 40,000 mg/l, or less than or equal to 39,000 mg/l. In some embodiments, the permeate stream 120 may comprise a total dissolved solids concentration of from 20,000 mg/l to 41,000 mg/l, from 20,000 mg/l to 40,000 mg/l, from 20,000 mg/l to 39,000 mg/l, from 25,000 mg/l to 41.000 mg/l, from 25,000 mg/l to 40,000 mg/l, from 25,000 mg/l to 39,000 mg/l, from 30,000 mg/l to 41,000 mg/l, from 30,000 mg/l to 40,000 mg/l, from 30,000 mg/l to 39.000 mg/l, or from any other range between 20.000 mg/l and 41.000 mg/l.

In embodiments, the permeate stream 120 may comprise a calcium ion concentration of from 30 mg/l to 350 mg/l, from 30 mg/l to 325 mg/l, from 30 mg/l to 300 mg/l, from 40 mg/l to 350 mg/l, from 40 mg/l to 325 mg/l, from 40 mg/l to 300 mg/l, from 50 mg/l to 350 mg/l, from 50 mg/l to 325 mg/l, from 50 mg/l to 300 mg/l, or from any other range between 30 mg/l and 350 mg/l.

In embodiments, the permeate stream 120 may comprise a magnesium ion concentration of from 20 mg/l to 500 mg/l, from 20 mg/l to 400 mg/l, from 20 mg/l to 300 mg/l, from 30 mg/l to 500 mg/l, from 30 mg/l to 400 mg/l, from 30 mg/l to 300 mg/l, from 40 mg/l to 500 mg/l, from 40 mg/l to 400 mg/l, from 40 mg/l to 300 mg/l, or from any other range between 20 mg/l and 500 mg/l.

In embodiments, the permeate stream 120 may comprise a strontium ion concentration of from 2 mg/l to 15 mg/l, from 2 mg/l to 10 mg/l, from 2 mg/l to 5 mg/l, from 2.5 mg/l to 15 mg/l, from 2.5 mg/l to 10 mg/l, from 2.5 mg/l to 5 mg/l, or from any other range between 2 mg/l and 15 mg/l.

The permeate stream 120 may further comprise monovalent ions. In embodiments, the monovalent ions may comprise $Na^+$, $K^+$, $Cl^-$, or combinations thereof.

In embodiments, the permeate stream 120 may comprise a sodium ion concentration of from 12,000 mg/l to 15.000 mg/l, from 12,000 mg/l to 14,500 mg/l, from 12,000 mg/l to 14,000 mg/l, from 13,000 mg/l to 15,000 mg/l, from 13.000 mg/l to 14,500 mg/l, from 13,000 mg/l to 14,000 mg/l, from 15,000 mg/l to 15.000 mg/l, from 15,000 mg/l to 14.500 mg/l, from 15,000 mg/l to 14,000 mg/l, or from any other range between 5,000 mg/l and 15.000 mg/l. In embodiments, the sodium ion concentration of permeate stream 120 may be less than those of the seawater 101. In embodiments, the sodium ion concentration of permeate stream 120 may be less than those of retentate stream 110.

In embodiments, the permeate stream 120 may comprise a potassium ion concentration of from 875 mg/l to 1,100 mg/l, from 875 mg/l to 1,000 mg/l, from 900 mg/l to 1,100 mg/l, from 900 mg/l to 1,000 mg/l, or from any other range between 875 mg/l and 1,100 mg/l. In embodiments, the potassium ion concentration of the permeate stream 120 may be lesser than those of the retentate stream 110.

In embodiments, the permeate stream 120 may comprise a chloride ion concentration of from 15,000 mg/l to 24,500 mg/l, from 15,000 mg/l to 24,400 mg/l, from 15,000 mg/l to 24,300 mg/l, from 16,000 mg/l to 24,500 mg/l, from 16,000 mg/l to 24,400 mg/l, from 16,000 mg/l to 24,300 mg/l, from 17,000 mg/l to 24,500 mg/l, from 17,000 mg/l to 24,400 mg/l, from 17,000 mg/l to 24,300 mg/l, or from any other range between 15,000 mg/l and 24,500 mg/l. In embodiments, the chloride concentration of the permeate stream 120 may be lesser than those of the seawater 101. In embodiments, the chloride concentration of the permeate stream 120 may be lesser than those of the retentate stream 110.

The permeate stream 120 may further comprise a bicarbonate ion. In embodiments, the permeate stream 120 may comprise a bicarbonate ion concentration of from 20 mg/l to 300 mg/l, from 20 mg/l to 250 mg/l, from 20 mg/l to 200 mg/l, from 30 mg/l to 300 mg/l, from 30 mg/l to 250 mg/l, from 30 mg/l to 200 mg/l, from 40 mg/l to 300 mg/l, from 40 mg/l to 250 mg/l, from 40 mg/l to 200 mg/l, or from any other range between 20 mg/l and 300 mg/l.

Still referring to FIG. 1, the retentate stream 110 may be mixed with barium additives 201 in a retentate treatment system 200. In embodiments, the retentate treatment system 200 may be a separate vessel that receives the retentate stream 110 and the barium additives 201.

Still referring to FIG. 1, the retentate treatment system 200 may be disposed downstream of the NF membrane 100. The retentate treatment system 200 may be in fluid communication with the NF membrane 100. The retentate treatment system 200 may be directly connected with the NF membrane 100.

The retentate treatment system 200 may be operable to mix the barium additives 201 with the retentate stream 110 to precipitate sulfate from the retentate stream 110 to form barite and reduce the sulfate ion concentration. The retentate treatment system 200 may be operable to separate the barite 202 from the retentate stream 110 to produce the barite 202 and the recycle water 203.

Figure 2:
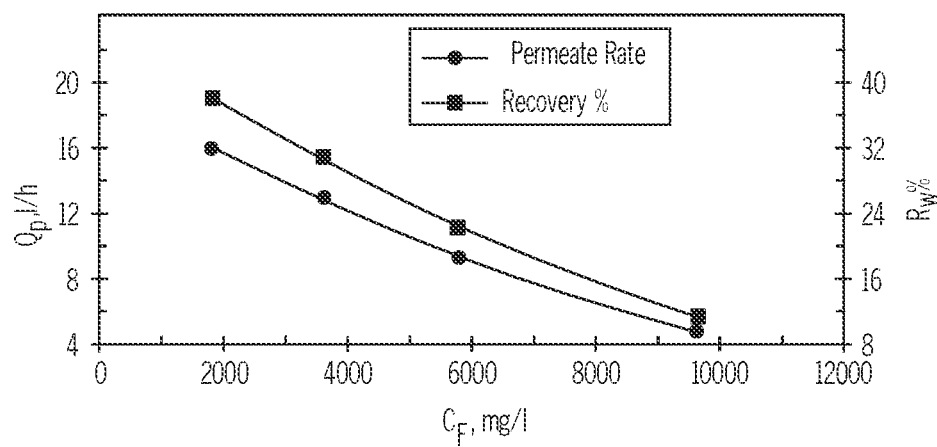
FIG. 2 is a graph of permeate stream rate and recovery rate as a function of a total dissolved solids concentration of seawater in the NF membrane.

As shown in FIG. 2, the permeate rate and recovery rate of the NF membrane 100 decreases as the total dissolved solids concentration of the seawater 101 increases. Thus, to increase the water recovery, additional treatment of the retentate stream 110 may be required. Treating the retentate stream 100 with the barium additives 201 may decrease the sulfate ion concentration of the retentate stream 110 by precipitating sulfate from the retentate stream 110. As stated above, the treated retentate stream could be reused in fracturing and drilling applications. Further as stated above, mixing barium additives 201 with the retentate stream 110 may form barite 202, which may be used as a weighting agent in drilling applications. The barite 202 may be formed according to the following equation 1. Thus, utilizing the barium additives 201 is beneficial to increase water recovery without additional treatment or complex infrastructure while producing valuable byproducts.

$$SO_4^{2-}+BaCl_2\cdot 2H_2O \rightarrow BaSO_4+2Cl^-+2H_2O \quad \text{[Equation 1]}$$

In embodiments, the barium additives 201 may comprise barium chloride dehydrate ($BaCl_2\cdot 2H_2O$), barium chloride ($BaCl_2$), or both. The barium additives 201 may not include calcium chloride dehydrate ($CaCl_2\cdot 2H_2O$), calcium chloride ($CaCl_2$)), or both.

In embodiments, the barium additives 201 are added at a barium ion concentration in mg/l of at least twice, or at least three times the sulfate ion concentration in the retentate stream 110.

In embodiments, the barium additives 201 may comprise a barium ion concentration of greater than or equal to 10.000 mg/l, greater than or equal to 15.000 mg/l, or greater than or equal to 20,000 mg/l. In embodiments, the barium additives 201 may comprise a barium ion concentration of less than or equal to 100,000 mg/l, less than or equal to 90,000 mg/l, or less than or equal to 80,000 mg/l. In some embodiments, the barium additives 201 may comprise a barium ion concentration of from 10,000 mg/l to 100,000 mg/l, from 10,000 mg/l to 90,000 mg/l, from 10.000 mg/l to 80,000 mg/l, from 15,000 mg/l to 100,000 mg/l, from 15,000 mg/l to 90,000 mg/l, from 15.000 mg/l to 80,000 mg/l, from 20.000 mg/l to 100,000 mg/l, from 20.000 mg/l to 90,000 mg/l, from 20,000 mg/l to 80.000 mg/l, or from any other range between 10,000 mg/l and 100,000 mg/l.

Still referring to FIG. 1, the barite 202 may be separated from the retentate stream 110 to produce the barite 202 and the recycle water 203. The barite 202 may be insoluble in the retentate stream 110. In embodiments, the recycle water 203 may be sent to evaporation ponds or used for fracturing fluid applications.

In embodiments, the barite 202 may comprise greater than or equal to 90 volume percent (V %), greater than or equal to 92.5 V %, or greater than or equal to 95 V % of sulfate ion from the retentate stream 110. In embodiments, the barite 202 may comprise less than or equal to 99.9 V %, less than or equal to 99.5 V %, or less than or equal to 99 V % of sulfate ion from the retentate stream 110. In embodiments, the barite 202 may comprise from 90 V % to 99.9 V %, from 90 V % to 99.5 V %, from 90 V % to 99 V %, from 92.5 V % to 99.9 V %, from 92.5 V % to 99.5 V %, from 92.5 V % to 99 V %, from 95 V % to 99.9 V %, from 95 V % to 99.5 V %, from 95 V % to 99 V %, or from any other range between 90 V % and 99.9 V %.

In embodiments, the recycle water 203 may comprise a sulfate ion concentration of greater than or equal to 0.01 mg/l, greater than or equal to 0.1 mg/l, or greater than or equal to 1 mg/l. In embodiments, the recycle water 203 may comprise a sulfate ion concentration of less than or equal to 1.500 mg/l, less than or equal to 1.000 mg/l, less than or equal to 500 mg/l, less than or equal to 100 mg/l, less than or equal to 50 mg/l, or less than or equal to 30 mg/l. In some embodiments, the recycle water 203 may comprise a sulfate ion concentration of from 0.01 mg/l to 1.500 mg/l, from 0.01 mg/l to 1.000 mg/l, from 0.01 mg/l to 500 mg/l, from 0.01 mg/l to 100 mg/l, from 0.01 mg/l to 50 mg/l, from 0.01 mg/l to 30 mg/l, from 0.1 mg/l to 1,500 mg/l, from 0.1 mg/l to 1.000 mg/l, from 0.1 mg/l to 500 mg/l, from 0.1 mg/l to 100 mg/l, from 0.1 mg/l to 50 mg/l, from 0.1 mg/l to 30 mg/l, from 1 mg/l to 1.500 mg/l, from 1 mg/l to 1.000 mg/l, from 1 mg/l to 500 mg/l, from 1 mg/l to 100 mg/l, from 1 mg/l to 50 mg/l, from 1 mg/l to 30 mg/l, or from any other range between 0.01 mg/l and 1,500 mg/l.

In embodiments, the recycle water 203 may comprise a total dissolved solids concentration of from 95.700 mg/l to 88,000 mg/l, from 95,000 mg/l to 80.000 mg/l, or from any other range between 95.700 mg/l and 88.000 mg/l.

EXAMPLES

The following examples illustrate one or more additional features of the present disclosure described previously. It should be understood that these examples are not intended to limit the scope of the disclosure or the appended claims in any manner.

Comparative Examples 1 and 2—Separation in NF Membrane

The seawater was introduced to the NF membrane. The NF membrane comprised 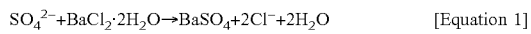 and had an average pore size of from 1 nm to 10 nm. The NF membrane produced the permeate stream and the retentate stream. Tables 1 and 2 below show the composition of seawater and the permeate stream and retentate stream. The retentate stream was not treated by barium additives.

TABLE 1

| Comparative Example 1 | | | |
|---|---|---|---|
| Parameters | Seawater | Permeate stream | Retentate stream |
| Bicarbonate | 148 mg/l | 44 mg/l | 135 mg/l |
| Calcium | 489 mg/l | 56 mg/l | 1,242 mg/l |
| Chloride | 25,140 mg/l | 19,970 mg/l | 31,559 mg/l |
| Sulfate | 3,450 mg/l | <2 mg/l | 11,040 mg/l |
| Magnesium | 1576 mg/l | 46 mg/l | 4305 mg/l |
| Potassium | 710 | 699 | 955 |
| Sodium | 16962 | 16429 | 22627 |
| Strontium | 5 | 2 | 37 |
| Total Dissolved Solids | 46,700 mg/l | 31,860 mg/l | 73,250 mg/l |
| pH | 7.86 | 7.10 | 7.55 |
| Conductivity (Scm$^{-1}$) | 56,600 | 45,600 | 73,200 |

TABLE 2

| Comparative Example 2 | | | |
|---|---|---|---|
| Parameters | Seawater | Permeate stream | Retentate stream |
| Bicarbonate | 150 mg/l | 151 mg/l | 125 mg/l |
| Calcium | 600 mg/l | 285 mg/l | 1,424 mg/l |
| Chloride | 31,589 mg/l | 24,109 mg/l | 40,157 mg/l |
| Sulfate | 4,698 mg/l | <50 mg/l | 17,399 mg/l |
| Magnesium | 2,116 mg/l | 299 mg/l | 8,897 mg/l |
| Potassium | 789 mg/l | 918 mg/l | 925 mg/l |

TABLE 2-continued

Comparative Example 2

| Parameters | Seawater | Permeate stream | Retentate stream |
|---|---|---|---|
| Sodium | 17,485 mg/l | 13,733 mg/l | 16,447 mg/l |
| Strontium | <1 mg/l | 3 mg/l | 31 mg/l |
| Total Dissolved Solids (TDS) | 56,638 mg/l | 38,627 mg/l | 84,449 mg/l |
| pH | 7.4 | 7.1 | 7.2 |
| Conductivity | >10000 S/cm | >10000 S/cm | >10000 S/cm |

As shown in Tables 1 and 2, the sulfate ion concentration was greatly reduced in the permeate stream <50 mg/l while it was greater than 10,000 mg/l in the retentate stream. The permeate streams were suitable for fracturing and drilling applications, but the retentate streams were unsuitable due to high concentration of sulfate ions.

In addition, the TDS concentration decreased from 46,700 and 56,638 mg/l in the seawater feed to 31,860 and 38,627 mg/l in the permeate stream. The TDS concentration increased in the retentate stream to 73,250 and 84,449 mg/l, which indicates that the NF membrane rejected the solids in the seawater. Furthermore, as shown in Table 2, divalent cations ($Ca^{2+}$, $Mg^{2+}$, $Sr^{2+}$) were filtered off where the concentration of divalent cations decreased in the permeate stream (285 mg/l, 299 mg/l, 3 mg/l) and increased significantly in the retentate stream (1424 mg/l, 8897 mg/l. 31 mg/l).

Example 1—Retentate Stream Treatments with Barium Additives 100 ml of the retentate stream was mixed with $BaCl_2$ and kept for 24 hours. The precipitation of $BaSO_4$ formed. The compositions and certain properties of the retentate stream, and the $BaCl_2$ treated retentate stream are provided in Table 3.

TABLE 3

Example 1

| | Retentate stream | After adding 1.91 g of $BaCl_2$ | After adding 4.0 g of $BaCl_2$ |
|---|---|---|---|
| pH @ 25° C. | 7.2 | 6.8 | 6.9 |
| Conductivity @25° C. (μs/cm) | >10000 | >10000 | >10000 |
| Alkalinity as $CaCO_3$ (mg/l) | N/A | N/A | N/A |
| Specific gravity @ 60° F. | 1.0735 | 1.07 | 1.062 |
| Bicarbonate (mg/l) | 394 | 232 | 125 |
| Chloride (mg/l) | 47,270 | 52,081 | 57,182 |
| Sulfate (mg/l) | 19,020 | 10,568 | 1,259 |
| Calcium (mg/l) | 1,513 | 1,426 | 1,405 |
| Potassium (mg/l) | 955 | 805 | 792 |
| Magnesium (mg/l) | 7,793 | 8,047 | 7,587 |
| Sodium (mg/l) | 22,627 | 23,256 | 21,261 |
| Barium (mg/l) | <1 | <1 | <1 |
| Strontium (mg/l) | 37 | <1 | <1 |
| TDS (mg/l) | 98,617 | 95,610 | 88,819 |

According to one aspect of the present disclosure, a process of treating nano-filtration (NF) membrane retentate comprises introducing seawater comprising a sulfate ion concentration of greater than or equal to 3000 mg/l to the NF membrane to produce a retentate stream and a permeate stream, wherein the retentate stream has a sulfate ion concentration greater than or equal to 10,000 mg/l, and mixing barium additives comprising barium chloride dehydrate ($BaCl_2 \cdot 2H_2O$), barium chloride ($BaCl_2$), or both with the retentate stream to precipitate sulfate from the retentate stream to form barite ($BaSO_4$) and reduce the sulfate ion concentration, wherein the barium additives are added into the retentate stream at a barium ion concentration of greater than 10,000 mg/l.

A second aspect of the present disclosure may include the first aspect, wherein further comprising separating the barite from the retentate stream to produce the barite and recycle water.

A third aspect of the present disclosure may include either one of the first or second aspects, wherein the recycle water comprises a sulfate ion concentration of less than or equal to 1,500 mg/l.

A fourth aspect of the present disclosure may include any of the first through third aspects, wherein the recycle water comprises a sulfate ion concentration of less than or equal to 50 mg/l.

A fifth aspect of the present disclosure may include any of the first through fourth aspects, wherein the barite comprises greater than or equal to 90 V % of sulfate ion from the retentate stream.

A sixth aspect of the present disclosure may include any of the first through fifth aspects, wherein the barium additives are added at a barium ion concentration in mg/l of at least twice the sulfate ion concentration in the retentate stream.

A seventh aspect of the present disclosure may include any of the first through sixth aspects, wherein the retentate stream comprises a sulfate ion concentration of greater than or equal to 9,500 mg/l.

An eighth aspect of the present disclosure may include any of the first through seventh aspects, wherein the retentate stream comprises total dissolved solids concentration of greater than or equal to 68.000 mg/l.

A ninth aspect of the present disclosure may include any of the first through eighth aspects, wherein the barium additives comprise barium ion concentration of greater than or equal to 25,000 mg/l.

A tenth aspect of the present disclosure may include any of the first through ninth aspects, wherein the barium additives comprise barium ion concentration of greater than or equal to 15,000 mg/l.

An eleventh aspect of the present disclosure may include any of the first through tenth aspects, wherein the seawater comprises total dissolved solids concentration of greater than or equal to 42,000 mg/l.

A twelfth aspect of the present disclosure may include any of the first through eleventh aspects, wherein the seawater further comprises divalent cations, and wherein the divalent cations are filtered in the NF membrane.

A thirteenth aspect of the present disclosure may include any of the first through twelfth aspects, wherein the seawater further comprises monovalent ions, and wherein the monovalent ions are unfiltered in the NF membrane.

It should be apparent to those skilled in the art that various modifications and variations may be made to the embodiments described in the present disclosure without departing from the spirit and scope of the claimed subject matter. Thus it is intended that the specification cover the modifications and variations of the various embodiments described in the present disclosure provided such modifications and variations come within the scope of the appended claims and their equivalents.

What is claimed is:

1. A process of treating nano-filtration (NF) membrane retentate comprising:

introducing seawater comprising a bicarbonate ion concentration of from 50 milligrams per liter (mg/l) to 300 mg/l; and a sulfate ion concentration of greater than or equal to 3000 mg/l to the NF membrane to produce a retentate stream and a permeate stream, wherein the retentate stream has a bicarbonate ion concentration of from 450 mg/l to 550 mg/l and a sulfate ion concentration of greater than or equal to 10,000 mg/l; and mixing barium additives comprising barium chloride dehydrate ($BaCl_2 \cdot 2H_2O$), barium chloride ($BaCl_2$), or both with the retentate stream to precipitate sulfate from the retentate stream to form barite ($BaSO_4$) and reduce the sulfate ion concentration, wherein the barium additives are added into the retentate stream at a barium ion concentration of greater than 10,000 mg/l.

2. The process of claim 1, wherein further comprising separating the barite from the retentate stream to produce the barite and recycle water.

3. The process of claim 2, wherein the recycle water comprises a sulfate ion concentration of less than or equal to 1,500 mg/l.

4. The process of claim 2, wherein the recycle water comprises a sulfate ion concentration of less than or equal to 50 mg/l.

5. The process of claim 1, wherein the barite comprises greater than or equal to 90 volume percent (V %) of sulfate ion from the retentate stream.

6. The process of claim 1, wherein the barium additives are added at a barium ion concentration in mg/l of at least twice the sulfate ion concentration in the retentate stream.

7. The process of claim 1, wherein the retentate stream comprises total dissolved solids concentration of greater than or equal to 68,000 mg/l.

8. The process of claim 1, wherein the barium additives comprise barium ion concentration of greater than or equal to 25,000 mg/l.

9. The process of claim 1, wherein the barium additives comprise barium ion concentration of greater than or equal to 15,000 mg/l.

10. The process of claim 1, wherein the seawater comprises total dissolved solids concentration of greater than or equal to 42,000 mg/l.

11. The process of claim 1, wherein the seawater further comprises divalent cations, and wherein the divalent cations are filtered in the NF membrane.

12. The process of claim 1, wherein the seawater further comprises monovalent ions, and wherein the monovalent ions are unfiltered in the NF membrane.

13. The process of claim 1, wherein the barium additive is barium chloride dehydrate ($BaCl_2 \cdot 2H_2O$).

* * * * *